Patented Aug. 16, 1927.

1,639,007

UNITED STATES PATENT OFFICE.

MATHIAS OVROM SEM, OF OSLO, NORWAY, ASSIGNOR TO DET NORSKE AKTIESELSKAB FOR ELEKTROKEMISK INDUSTRI OF NORWAY, OF OSLO, NORWAY.

PROCESS OF BUILDING UP SELF-BAKING ELECTRODES.

No Drawing. Application filed September 26, 1925, Serial No. 58,850, and in Norway October 4, 1924.

The present invention relates to electrodes being baked in the furnace in which they are used, and the object of the invention is a process whereby such electrodes are built up in a simpler and more practical way than heretofore known.

In most of the stationary carbide and ferro-alloy furnaces the building up of the electrode-sections is effected by welding a new section to the metallic mantle which encloses the electrode mass, and filling the new section with raw electrode mass. The operation is carried out in a closed room above the furnace. In furnaces arranged for tilting, as for instance steel furnaces, and in plants where the space above the furnace is too small for building a tamping-house, this method of connection cannot conveniently be used. I have now found that in such furnaces the connection may conveniently and safely be effected by placing a previously prepared section of raw electrode mass on the top of the electrode to which it is to be connected, and connecting as below described. This enables the preparation of such raw electrode sections outside the furnace in which they are to be employed, as for example at electrode factories, and transporting the same to their place of use.

I am aware of previous experiments of connecting prebaked carbon electrodes by giving their ends a suitable form and coating with tar or electrode mass. It has, however, proved impossible to attain a stable connection between a prebaked electrode and raw electrode mass which is afterwards baked on the electrode. By connecting prebaked electrodes, no other contact is therefore obtained than that which is due to the shape of the end pieces. They cannot be pasted together by means of raw mass. The only effective connection between two baked carbon or graphite electrodes is therefore one with thread and nipple.

With unbaked electrodes, however, an excellent connection may be attained by pasting. If the electrode mass contains sufficient binder, it will at 100°–200° C. be semi-liquid and between two sections of such mass a completely homogeneous connection will be formed, especially if the mass is subjected to pressure during the baking. When using selfbaking electrodes, care should be taken to keep the upper end of the electrode as raw as possible when a new section is to be connected thereto. According to my present invention, I make complete electrode-sections, well tamped or pressed, at some convenient place, and then bring them to the furnace in which they are to be used. I thus avoid the tamping of the electrode mass in or above the electric furnace and at the same time have the advantage of being able to employ the most effective machinery and tools for pressing or tamping the mass. In cold state the mass is hard and little movable relatively to the mantle and such mantle-sections with raw mass may, therefore, be subject to trade and transport in the same way as usual electrodes. The connection between two electrode-sections will be just as good as by continuous tamping of electrode mass into the mantle at the place where it is used.

The electrode-sections may consist of raw electrode mass alone or raw electrode mass with a metal armature, such for instance, as a metallic casing or mantle enclosing the raw mass. This casing may again be provided with radial ribs penetrating into the mass as is well known in the art. The mode of building up an electrode from such sections varies slightly according to the nature of the metallic armature of the electrode in question.

Electrodes in which the external mantle is without ribs may be built up by placing a new mantle-section filled with raw mass on top of the electrode in use. The mantles may be welded together end to end, or may telescope slightly, the new section preferably entering a little into the old one, which should then not be completely filled with original electrode mass. As soon as the new section is sufficiently heated the mass is rendered movable relatively to the mantle and will sink towards the mass in the electrode below. To be quite sure of a complete incorporation, some binder or raw mass with much binder preferably heated may be placed between the electrodes. Most self-baking electrodes have besides an external mantle also radial ribs or other metallic reinforcement penetrating into the electrode mass. The method of connecting will then be as follows: The armature may be made as described in foreign patent applications by Jens Westley, of common ownership herewith, as follows:

Norway, No. 25,614, filed January 12, 1922; Finland, No. 2,255, filed January 31, 1923; Sweden, No. 3.154/23, filed November 14, 1923; France, No. 180,147, filed November 14, 1923; Canada, No. 283,035, filed December 14, 1923.

The ribs then only project at one end of the mantle-section, and at the other end working openings should be arranged for welding the ribs together. Or, in all sections the ribs are longer than the mantle, the ends of the ribs projecting, for instance, 10 centimeters beyond the mantle. The mantle is tamped full of electrode mass, but the ends of the ribs remain free. The connection may be carried out above the electric furnace in which the electrode is used or the short electrode in use may be lifted out of the furnace for connection. The new section is brought in place so as to make the rib-ends of both sections meet and the rib-ends are then connected by welding or screwing. Raw electrode mass is then tamped around the ribs and the openings are closed by welding thereto, a complete belt connecting both mantles, or by bending back and welding the mantle portions which form the working openings.

The foregoing detailed description of my invention has been given for clearness of understanding only and no undue limitation should be deduced therefrom but the appended claims should be construed as broadly as permissible in view of the prior art.

What I claim as new and desire to secure by Letters Patent of the United States, is:

1. The process of building up selfbaking electrodes which comprises preparing electrode sections of raw electrode mass outside the furnace in which they are to be employed, and connecting said sections to the non-working ends of partly used electrodes.

2. The process of building up selfbaking electrodes which comprises preparing electrode sections of raw electrode mass outside the furnace in which they are to be employed, and connecting said sections with additional raw electrode mass to the non-working ends of partly used electrodes.

3. The process of building up selfbaking electrodes provided with metallic armatures which comprises preparing electrode sections of raw electrode mass enclosed in metallic armatures outside the furnace in which they are to be employed, and connecting said sections to the non-working ends of partly used electrodes of similar character.

4. The process of building up selfbaking electrodes provided with metallic armatures which comprises preparing electrode sections of raw electrode mass enclosed in metallic armatures outside the furnace in which they are to be employed, and electrically and mechanically connecting said sections to the non-working ends of partly used electrodes of similar character.

5. The process of building up selfbaking electrodes provided with metallic armatures and metallic reinforcements which comprises preparing electrode sections of raw electrode mass enclosed in metallic armatures and provided with metallic reinforcements outside of the furnace in which they are to be employed, and electrically and mechanically connecting the respective armatures and reinforcements of said sections to the corresponding parts of the non-working ends of partly used electrodes of similar character.

6. The process of building up selfbaking electrodes provided with metallic armatures having radial ribs which comprises preparing electrode sections of raw electrode mass enclosed in such metallic armatures outside of the furnace in which they are to be employed, electrically and mechanically connecting the respective armatures and ribs of said sections to the corresponding parts of the non-working ends of partly used electrodes of similar character, and connecting the raw electrode mass of the sections prepared outside of the said furnace with additional raw electrode mass to the electrode mass of the non-working ends of said partly used electrodes.

7. The process of building up selfbaking electrodes provided with metallic armatures having radial ribs which comprises preparing electrode sections of raw electrode mass enclosed in such metallic armatures outside the furnace in which they are to be employed, electrically and mechanically connecting the respective armatures and ribs of said sections to the corresponding parts of the non-working ends of partly used electrodes of similar character, and connecting the raw electrode mass of said sections prepared outside of the said furnace to the electrode mass of the non-working ends of said partly used electrode by means of additional raw electrode mass by the application of heat and pressure thereto.

Signed at New York, N. Y., Sept. 22nd, 1925.

MATHIAS OVROM SEM.